United States Patent

[11] 3,599,029

| [72] | Inventor | William C. Martyny |
| | | Lyndhurst, Ohio |
| [21] | Appl. No. | 873,012 |
| [22] | Filed | Oct. 31, 1969 |
| [45] | Patented | Aug. 10, 1971 |
| [73] | Assignee | General Electric Company |

[54] FLUORESCENT LAMP ENVELOPE WITH TRANSPARENT PROTECTIVE COATING
6 Claims, 2 Drawing Fig.

[52] U.S. Cl.................................................. 313/109,
313/185, 313/220, 313/221
[51] Int. Cl.................................................. H01j 61/35
[50] Field of Search.......................................... 313/109,
185, 220, 221

[56] References Cited
UNITED STATES PATENTS

| 3,067,356 | 12/1962 | Ray | 313/221 |
| 3,350,598 | 10/1967 | Corbin et al. | 313/220 |
| 3,377,494 | 4/1968 | Repsher | 313/109 |

Primary Examiner—Roy Lake
Assistant Examiner—Palmer C. Demeo
Attorneys—Ernest W. Legree, Henry P. Truesdell, Frank L. Neuhauser, Oscar B. Waddell and Joseph B. Forman ABSTRACT: A fluorescent lamp having on the inner surface of its envelope a transparent protective coating consisting of a layer of titanium dioxide adherent to the glass and a layer of aluminum oxide thereover. The coating is prepared by flushing through the glass envelope or tube a mixture comprising a solution of tetrabutyl titanate in a thinner and a dispersion of aluminum oxide in an organic binder, and then drying. The phosphor coating is applied over the protective coating in conventional manner using a water soluble binder system and other manufacturing steps are unchanged. Advantages are higher lumens, improved maintenance particularly in highly loaded lamps, elimination of oxide rings, and avoidance of darkening where the phosphor coating is thin.

PATENTED AUG 10 1971　　　　　　　　　　3,599,029

Inventor:
William C. Martyny
by　*Ernest F. ......*
His Attorney

FLUORESCENT LAMP ENVELOPE WITH TRANSPARENT PROTECTIVE COATING

BACKGROUND OF THE INVENTION

The invention relates to protective coatings in low pressure discharge lamp envelopes and more particularly to coatings applied to conventional soda-lime silica glass envelopes of fluorescent lamps which are subject to a deleterious reaction with mercury at the glass face. It has been known for a long time that glass subjected to ultraviolet radiation decreases in transmission, such effect being generally referred to as solarization. Also the glass surface is deleteriously affected by the discharge, primarily by amalgamation of the mercury with alkali and other metals reduced from their oxides at the glass surface by the effect of the electric discharge. The attack of the glass is most severe in lamps where the glass is bare as in aperture lamps which have a longitudinally extending strip or aperture clear of phosphor.

In U.S. Pat. No. 2,295,626—Beese (1942) it is proposed to coat the inner bare surface of the ultraviolet transmitting glass envelope of a germicidal lamp with silica in order to protect the glass. In U.S. Pat. No. 3,067,356—Ray, it is proposed to apply to the inner surface of a fluorescent lamp envelope a coating of alumina. Since such coatings comprise a plurality of minute discrete particles, they must be relatively thick in order to prevent a reaction at the glass surface and this causes an excessive light loss. When the coatings are made thin enough to avoid excessive light absorption or scatter, protection of the surface is inadequate. Finally, such coatings when thick may reduce the adhesion of the phosphor to the glass.

While the attack of the glass is a maximum where there is no protective phosphor layer, it occurs in all fluorescent lamps to some degree and may be quite severe in highly loaded fluorescent lamps, particularly in regions where the phosphor coating is thin. In U.S. Pat. No. 3,377,494—Repsher, it is proposed to provide a protective coating of titanium dioxide on the inner glass surface of a fluorescent lamp. Such a coating may be deposited as a very thin transparent and continuous layer by applying on the envelope an organometallic compound which is convertible after application to the oxide. Thus tetraisopropyl titanate and tetrabutyl titanate may be applied dissolved in an appropriate solvent such as butyl alcohol or butyl acetate. The solvent evaporates upon application and moisture from the air hydrolyzes the titanate as fast as the solvent evaporates forming titanium dioxide which remains. While a clear transparent protective film may thus be formed, it is highly reflective on account of the high index of refraction of $TiO_2$ so that considerable loss of light occurs at the film face. If the titanium dioxide coating is relatively thick, an interference pattern may be encountered. The Repsher patent proposes to minimize the interface loss and possible interference pattern by adding to the organic titanium compound some other organic metal compound which is convertible to the oxide. For instance to tetraisopropyl titanate, Repsher proposes adding magnesium acetate in butyl alcohol so that upon application and heating, a mixed titania magnesia film results. While such a mixed film does reduce the light loss, the end result is still a reduction in light output when the film is made thick enough to achieve a worthwhile improvement in maintenance.

SUMMARY OF THE INVENTION

The object of the invention is to provide a protective film or coating within a fluorescent lamp envelope which will achieve the desired improvement in maintenance without introducing other disadvantages such as reduction in light output, which is practical and economical to apply, and which is superior in performance to prior coatings.

In accordance with the invention, the foregoing objects are achieved by means of a composite coating comprising an exceedingly thin clear layer consisting essentially of titanium dioxide next to the glass and having a thickness in the range of 0.002 to 0.02 microns, and thereover a much thicker layer consisting essentially of aluminum oxide having a thickness in the range of 1 to 10 microns.

According to my preferred process, the composite film is laid down in a single operation by flushing through the bulb a mixture comprising a solution of an organic titanate in a thinner and a dispersion of aluminum oxide in an organic binder. Drying in ambient air which contains some moisture is all that is required and no special lehring is needed at this stage. The phosphor coating is then applied in the usual manner using a water soluble binder system. A single lehring is then sufficient and subsequent manufacturing steps are unchanged.

DESCRIPTION OF PREFERRED EMBODIMENTS

Figure 1:
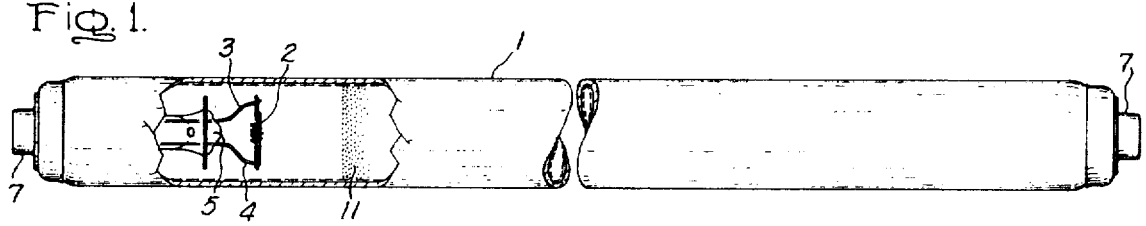
FIG. 1 shows an embodiment of a lamp according to this invention.
Figure 2:
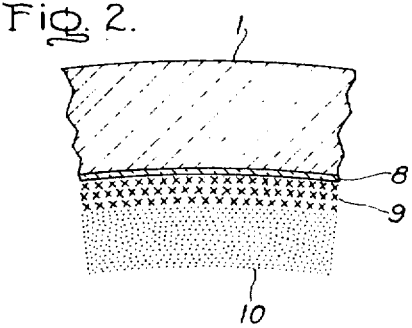
FIG. 2 shows a cross section through the middle of the lamp.

In FIG. 1, the sealed envelope 1 comprises an elongated soda-lime silica glass tube of circular cross section. It has the usual electrode 2 at each end supported on inlead wires 3, 4 which extend through a glass press 5 in a mount stem 6 to the contacts of a base 7 affixed to the end of the lamp. The sealed tube is filled with an inert gas such as argon or a mixture of argon and neon at a low pressure, for example 2 millimeters, and a small quantity of mercury, at least enough to provide a pressure of about 6 microns during operation. As best seen in FIG. 2 showing a section through the envelope, to the inner surface of the glass tube there is applied a protective coating comprising a thin clear layer 8 consisting essentially of titanium dioxide which is strongly adherent to the glass, and thereover a thicker layer 9 consisting essentially of aluminum oxide. Deposited over the protective coating is a phosphor coating 10 which may consist for example of calcium halophosphate activated with antimony and manganese or any other suitable fluorescent lamp phosphor. The thicknesses of the various layers or coatings are much exaggerated relative to the glass in the drawing.

Tetrabutyl titanate $(C_4H_9O)_4Ti$ having a molecular weight of 340 is commercially available and occurs as a light-yellow liquid which forms a clear solution in an organic solvent such as butyl acetate. When a typical solution containing about 5 percent by volume to titanate is applied to glass, the solvent evaporates upon application leaving the titanate deposited upon the surface. Usually there is sufficient moisture in the air to hydrolyze the titanate as fast as the solvent evaporates, forming titanium dioxide which remains and butyl alcohol which also evaporates. The titanium dioxide layer or coating which forms is extremely thin and strongly adherent to the glass so that it cannot be wiped off. The coating is more reflective than bare glass due to the relatively high index of refraction of titanium dioxide which is about 2.6 while that of soda lime glass by contrast is about 1.4. The thickness of the coating depends upon the concentration of tetrabutyl titanate in the solution, the viscosity of the solution, the temperature, the rate of drying, etc. In sufficient thickness, the film is iridescent. By reason of its high reflectance, the film cuts down the transmission of light. It absorbs more at the blue end of the spectrum, and for this reason transmitted white light seen through it has a slightly yellowish cast.

In the Repsher patent, a thickness of titania coating from 0.02 to 0.2 micron is recommended. I have found that such a coating when applied to a fluorescent lamp reduces the light output by as much as 5 percent and more, and this is too high a price to pay for the improvement in maintenance. The Repsher patent proposes improving the transmission by adding another metal oxide to the titanium oxide in order to reduce its reflectivity, for instance a mixture of titanium dioxide and magnesium oxide in a molar ratio of 1 to 1. I have found that while this does reduce the interface light losses, they remain substantial and the maintenance of the lamp drops rapidly after a few thousand hours of operation.

In the Ray patent, an aluminum oxide protective barrier layer is used. Finely divided aluminum oxide is milled in a lacquer vehicle such as a solution of ethyl cellulose in butyl acetate and naphtha to make a suspension, the suspension is flowed onto the glass, and after drying, the glass envelope is lehred. Thickness of the coating depends upon the viscosity of the suspension and the proportion of suspended aluminum oxide in the suspension. The coating thus formed is translucent with a bluish cast, and a source of white light seen through it appears yellowish. When applied to clear glass, the coating produces a noticeable haze or cloudiness and it wipes off easily. In the Ray patent, an aluminum oxide barrier layer having a thickness from 0.0005 inch to 0.001 inch (12.7 to 25.4 microns) is stated to be necessary in order for the tube to remain transparent and the passage of light therethrough not to be substantially affected, while still preventing the formation of mercury alkali amalgam. It is stated that above this range the glass tends to become more translucent (and less light is transmitted) while below, the mercury alkali reaction will not be substantially inhibited.

My invention achieves much superior results by a composite film comprising a very thin layer consisting essentially of titanium dioxide and a much thicker layer consisting essentially of aluminum oxide thereover. The titanium dioxide layer of my invention has a thickness from 0.002 to 0.02 microns, and the preferred range is 0.005 to 0.01 microns. Comparing this with the range from 0.02 to 0.2 micron of the Repsher patent, the mean thickness of the $TiO_2$ layer in my composite coating is one-tenth Repsher's. The alumina layer of my composite coating is from 1 to 10 microns in thickness, preferably 2 to 5 microns, and this is many times thicker than the titania layer. However, comparing it with the alumina layer of the Ray patent which is 12.7 to 25.4 microns thick, the mean thickness of alumina layer in accordance with my invention is less than one-fifth Ray's mean, and my maximum is less than the minimum acceptable to Ray. Surprisingly, however, my composite coating has better adherence than the alumina layer of the Ray patent and higher light transmission and better maintenance then the films of either reference.

The composite coating of my invention can be laid down in steps, that is first the $TiO_2$ layer and then the $Al_2O_3$ layer. However a valuable feature of my process is that both layers can be laid down simultaneously in a single operation. This is done by flowing onto the glass a mixture comprising the organic titanate in solution and the aluminum oxide as a suspension in a lacquer. Also no additional lehring is involved and a single lehring after application of the phosphor suffices.

While the layer adhering directly to the glass consists essentially of titania, it may include a minor proportion of alumina. The proportion will depend upon the method of preparation, being greater, for instance as much as 10 percent, where my preferred process is used in which both layers are laid down simultaneously in a single operation. Also the alumina layer may contain a minor proportion of titania, for instance 1 percent, and here again the percentage will depend upon the conditions of preparation. These minor occlusions or admixtures in each layer of the substance of the other layer do not reduce the effectiveness of the composite film.

A preferred process for applying the composite coating in accordance with my invention is as follows: (1) a solution is prepared by mixing 30 ml. of tetrabutyl titanate into 1,000 ml. of thinner consisting of 50 percent butyl acetate and 50 percent naphtha; (2) a stable dispersion is obtained by placing 125 grams of aluminum oxide in a pebble mill with 2,500 ml. of ethyl cellulose binder and milling for 150 hours. Ethyl cellulose binder consists of about 2.5 percent by weight ethyl cellulose in a thinner consisting of equal parts butyl acetate and naphtha; (3) 200 ml. of the aluminum oxide suspension from (2) is mixed with the tetrabutyl titanate solution from (1) to form a stable suspension; (4) the suspension from (3) is flushed through an open-ended glass bulb or tube suitably by drawing it up into the tube supported vertically and then allowing it to drain out and dry. At this point a translucent coating results having the following characteristics: (a) a titanium dioxide layer having a thickness of 0.005 to 0.01 microns adheres tightly to the glass surface; (b) on top of the titanium dioxide layer is an aluminum oxide layer 2 to 5 microns in thickness which at this point still includes the binder; (5) using a water soluble binder system, the phosphor coating is applied over the protective barrier coating and lehred in the usual manner. This sole lehring wherein the glass tube is baked at a temperature of 550° to 600° C just below the deformation temperature of the glass serves to drive the binder out of the alumina layer and also out of the phosphor coat and is sufficient. The tube component is then completed into an electric lamp envelope by sealing electrode mounts into the ends and processed to a complete lamp in the usual way.

Other organic titanate compounds which hydrolize to $TiO_2$ and the corresponding alcohol may be used in lieu of tetrabutyl titanate, for instance isopropyl titanate.

When aluminum oxide is applied directly to glass in a lacquer vehicle and then lehred, particles of aluminum oxide (which can readily be seen under a microscope) must adhere directly to the glass. In the case of my composite coating, the titania forms a continuous layer on the glass which is tightly adherent and cannot be wiped or brushed off. The titania film is substantially continuous and individual particles cannot be distinguished by an optical microscope or under X-rays. In the composite coating of my invention, the adherence of the aluminum oxide layer consisting of individual particles is improved by the presence of the titania layer. The result is that the aluminum oxide layer in my composite coating is much more adherent and can only be wiped off with considerable difficulty and appreciable pressure. This means that flaking off is much reduced and adhesion of the phosphor which depends upon the adhesion of the alumina layer, is likewise improved.

A titania layer in the range of 0.005 to 0.01 microns thick by virtue of its reflectivity cuts down the transmission of light from a fluorescent lamp by about 3 percent. When, in accordance with my invention this layer is combined with an aluminum oxide layer in the range of 2 to 5 microns thick, the transmission is restored to normal, that is it is about the same as if no coating were present. The $Al_2O_3$ layer by itself in the chosen thickness appears to operate as an antireflective film which alone would increase the transmitted light. Thus when combined with the reflective titania layer which reduces the transmission of light, the alumina layer restores the transmission to normal.

The improvement in maintenance with my composite coating which is better than with either titania or alumina coating alone in much greater thickness, is not fully understood. Probably the alumina layer alone is not an effective barrier because it consists of discrete particles and is not continuous. On the other hand a continuous titania layer alone is initially quite effective because it prevents the mercury vapor from contacting the glass and forming an alkali-containing amalgam, and in addition is opaque to ultraviolet. However under continuous attack by both the discharge and the ultraviolet radiation, the titania film appears to break down. I have observed that after a few thousand hours of operation, such a coating becomes speckled with black spots where the mercury has reacted with alkali forcing its way through the titania coating. In the case of my composite coating, the titania layer performs its usual function and the alumina layer would seem to be available to absorb or hold back any deleterious material such as alkali penetrating through any breaks or pinholes in the titania layer.

My composite barrier layer improves maintenance in all fluorescent lamps, normally loaded and highly loaded, phosphor-coated or bare glass. However the improvements are most dramatic in lamps where poor maintenance has been a problem, as in highly loaded lamps and aperture lamps having a strip of bare glass.

By way of example, I have obtained the following advantages in highly loaded fluorescent lamps of both the noncircular cross section type known as Power Groove and of the circular cross section type known as 1,500 milliampere T12 lamps: (1) an increase of about 2 percent in the hundred hour lumen output; (2) an increase of approximately 7 percent in lumen maintenance at 3,000 hours; (3) elimination of the oxide rings which develop after burning; (4) elimination or substantial reduction of the darkening which occurs in the thinly coated areas of the noncircular cross section (Power Groove) lamps.

In FIG. 1, the speckling 11 represents the darkening which develops in fluorescent lamps forward of the cathodes. It is generally referred to as oxide ring and consists of mercury compounds. Oxide ring is a problem particularly with highly loaded lamps such as the 1,500 milliampere T12 lamp illustrated. It is completely eliminated by the composite barrier layer of my invention.

In noncircular cross section (Power Groove) lamps such as disclosed in U.S. Pat. No. 2,915,664—Lemers and 2,950,410—Lemmers and Aicher, darkening occurs more rapidly in thinly coated areas such as on either side of the centerline between reentrant portions or grooves. Such darkening is eliminated or substantially reduced by the barrier layer of my invention.

What I claim as new and desire to secure by Letters Patent of the United States is:

1. A low pressure discharge lamp comprising a sealed elongated glass envelope having electrodes sealed therein at opposite ends, said envelope enclosing a charge of mercury and an inert ionizable starting gas, and a composite protective barrier coating adhering to the inner surface of said envelope, said coating comprising a layer consisting essentially of titanium dioxide having a thickness from 0.002 to 0.02 microns coated on and adhering to the inner surface of said envelope and a layer consisting essentially of aluminum oxide 1 to 10 microns thick over said titanium dioxide layer.

2. A lamp as in claim 1 wherein the titanium dioxide layer is from 0.005 to 0.01 microns thick and the aluminum oxide layer is from 2 to 5 microns thick.

3. A lamp as in claim 1 which is a fluorescent lamp and comprises a phosphor coating over the protective barrier coating.

4. A component for a low pressure discharge lamp envelope comprising a glass tube having a composite protective coating adhering to its inner surface, said coating comprising a layer consisting essentially of titanium dioxide having a thickness from 0.002 to 0.02 microns coated on and adhering to the inner surface of said tube and a layer consisting essentially of aluminum oxide 1 to 10 microns thick over said titanium dioxide layer.

5. A component as in claim 4 wherein the titanium dioxide layer is from 0.005 to 0.01 microns thick and the aluminum oxide layer is from 2 to 5 microns thick.

6. A component as in claim 4 having a phosphor coating over the protective barrier coating.